Sept. 5, 1961     E. P. AGHNIDES     2,998,931
FAUCET AERATORS
Filed Aug. 4, 1959
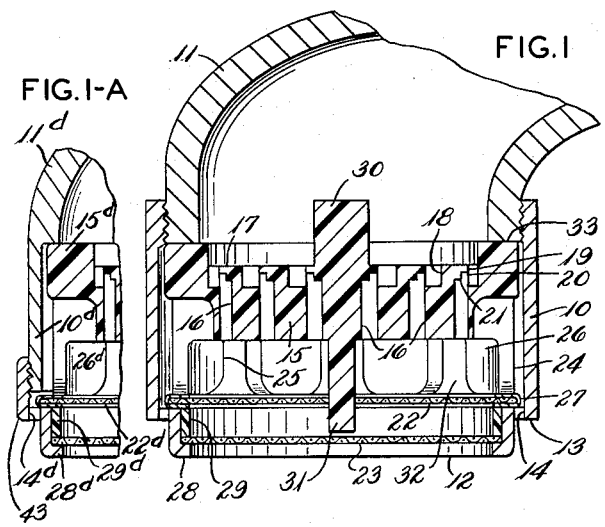
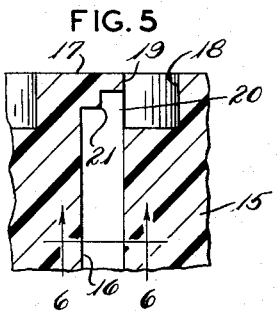
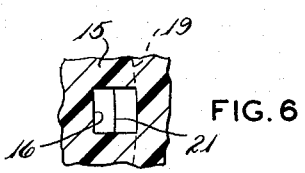
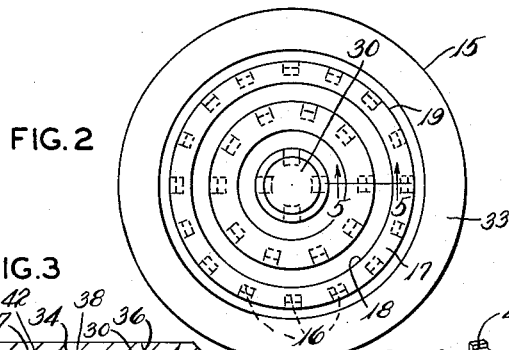
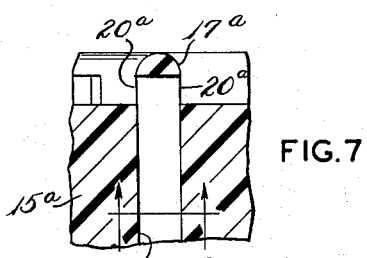
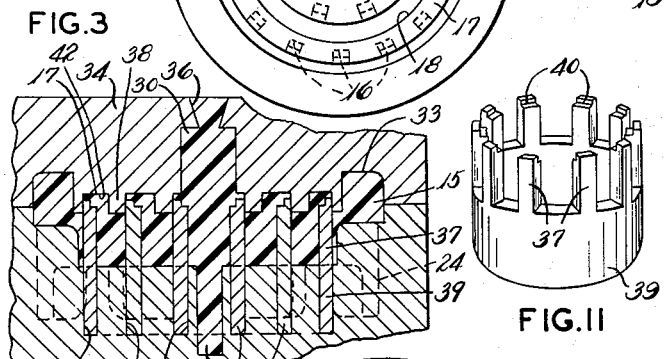
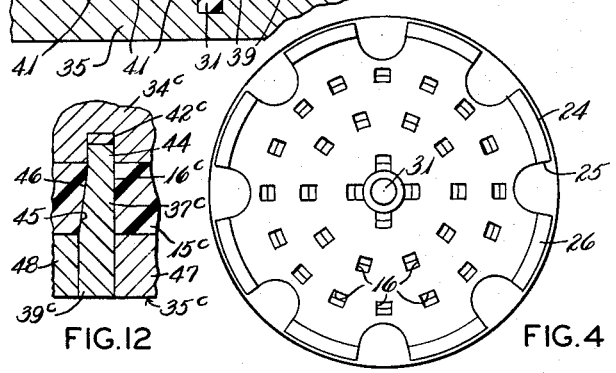
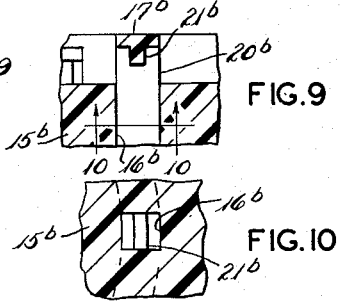
INVENTOR.
ELIE P. AGHNIDES
BY
Moore & Hall
ATTYS

United States Patent Office 2,998,931
Patented Sept. 5, 1961

2,998,931
FAUCET AERATORS
Elie P. Aghnides, 46 W. 54th St., New York 19, N.Y.
Filed Aug. 4, 1959, Ser. No. 831,588
23 Claims. (Cl. 239—431)

This invention relates to devices for aerating water, and particularly to devices for attachment to or use on domestic public and industrial water systems, and has for its object the provision of an improved device of this character. Aeration devices are now in wide use on the faucets of such water systems to aerate the water and otherwise improve the discharged water.

Extensive investigations and experiments have confirmed my conception of an aerator of simplified construction which gives equal or superior results to the aerators now in use. My invention provides a casing for attachment to a water supply system having therein a single perforate member on the upstream or water-entering side having a multiplicity of small passageways through which the water passes after entering the casing. This member is mounted in the casing transverse to the direction of water flow, which is advantageously generally flat, having a peripheral shape to effect close contact with the interior of the casing. My invention is based to a large extent on the arrangement and proportioning of the dimensions of the individual passageways to impart to the water passing therethrough surprising properties. The passageways extend from the downstream or emerging side of the perforate member and terminate with ribs on the upstream side. Entrance openings on the upstream side of each passageway extend from the sides of the ribs at an angle, preferably 90° to the longitudinal extent of the passageway. Preferably, opposed entrance openings are continuous with an upstream chamber of larger cross-section area so that opposed water jets entering said openings, impinge upon each other, then change their direction of flow through the length of each passageway, resulting in a turbulence of the jet stream of water as it emerges into a downstream chamber of larger cross-sectional area, whereby a greater amount of air may be entrained in the water to provide a soft, continuous, coherent, bubbly, oxygenated stream emerging from the aerator. The flow of water through the passageways in the perforate member, changes the physical state or form of the water entering the chambers causing it to vary from a state of reduced turbulence to such impaired coherence as to have a swollen whitish appearance as it emerges from the member.

The passageways are so constructed and proportioned, in the preferred form of my invention, that water forced therethrough at a selected range of velocity, such as results from the pressure of the usual water supply system, is given such turbulence that the emerging stream or jet is whitish in appearance and swollen when compared with a stream emerging from a bore hole of the same diameter as the chamber. The issuing turbulent stream, because of its velocity and physical structure, has the capacity to carry along a large amount of air.

The improvement in my aerator comprising a casing and the perforate member can be used advantageously in combination with means for adding air into the emerging streams. My invention, accordingly, comprises an aerator casing having my perforate member mounted therein on the upstream side in combination with means for introducing air into the emerging streams. One or more streams or other perforate members, or other resistance or confining means, may be used in the aerator on the downstream side of the perforate member to effect an intermixing of the air with the turbulent streams or jets emerging from the perforate member.

The invention in one of its forms, has a substantially cylindrical diaphragm for producing jet streams of water, perforations in the diaphragm forming elongated water passageways through the diaphragm arranged in a substantially annular row, and a substantially annular rib in the upstream surface of the diaphragm extending adjacent the upstream ends of the passageways, the rib having flow impairing openings joining the upstream ends of the water passageways with the upstream side of the diaphragm. In the commercial aerators of the prior art the upstream discs that produced the jets of water, were thin perforated diaphragms. In carrying out the invention as herein described the diaphragm is made somewhat thicker so that the orifice therein is elongated, compared with the orifices of the thin diaphragms, that is it is long enough so that in combination with the other elements of the invention the whitish coherent stream of impaired coherence is produced.

My invention not only reduces the number of parts of the aerator but they can be made in shapes which facilitate plastic molding and assembly. Prior types of aerators have been made employing plastic or partially plastic perforate members, but where the jet stream passageways have been molded through the plastic member with pins in the molding members projecting through the molding cavity to contact a mold surface forming the upstream or downstream surface of the member, a flash is formed during the molding operation. This flash is difficult and expensive to remove. Attempts have been made to avoid such flash by forming the surface opposite the pins with apertures into which the ends of the pins may be fitted as the mold portions are assembled to enclose the molding cavity. This requires superaccuracy in fitting and the alignment of the pins and recesses, and even then pins are quickly misaligned and broken. This difficulty is eliminated in the present invention by extending the entering ends of the pins into an open groove in the opposed mold section with the side surfaces of the ends of the pins substantially coincident with the sides of the grooves in the mold. In the corresponding molded product made in such a mold, the grooves form annular ribs in the upstream side of the perforate disk member and the pins mold passageways that communicate with open grooves between the annular ribs. In this type of mold structure and molding process, flash is eliminated, or reduced to a minimum, between the respective pin and mating mold sections. In a preferred form of the invention, the pins are made substantially rectangular in cross section, the radially outer surface or inner and outer surfaces of the end of the pin forming the molded perforations being arcuate to coincide with the arcuate sides of the open groove in the opposed mold section. In other modified forms the upstream surfaces of the ribs may be streamlined arcuately or beveled to facilitate water flow around the ribs.

In faucet aerators as heretofore manufactured, the lateral side surface of the casing has been provided with slots or other perforations for the entrance of air. Sometimes when the screens at the downstream end of the aerator become slightly clogged, there is a tendency for the stream of water to emerge forceably through such openings in a lateral direction. In my improved aerator as herein described, the entrances for air into the aerating chamber are constructed in the bottom of a ledge adjacent the downstream end of the aerator. As such openings extend in the direction parallel to the water stream, any tendency for the water to flow backwardly through the aerating entrances, as when the screens become clogged, would result in streams of water deflected downwardly in the normal water stream path instead of laterally. The omission of openings in the sides of the casing also improves its appearance and cleanliness.

A further improvement embodied in the present aerator is the provision of a permanently mounted downstream screen at the lower end of the aerating chamber, and a removable second screen spaced above said first screen and preferably connected to the plastic perforate member so that it may be removed along with said perforate member for ready accessibility for the cleaning of both screens.

An object of the invention is to provide an improved mold and molding process for efficiently manufacturing perforate plastic disks for faucet aerators. A further object is to provide an improved perforated disk for use in faucet aerator assemblies. Also in the use of my improved disk, and of my improved aerator embodying said disk, another object of the invention is to provide improved operation by introducing turbulence in the jet streams of water, making them more efficient in the admixing air and water, requiring less resistance in their path, and affording an output having a higher ratio of air to water. Still another object is to provide a faucet aerator which may be readily disassembled for facility of cleaning, also an aerator structure which will not squirt or splash water laterally if the aerator should become clogged with foreign matter from the water supply. The invention may be applied to permanent and integral faucet constructions as well as to attachments for existing faucets.

These and other novel features of the invention will be better understood by considering the following detailed description and by reference to the accompanying drawings, in which:

FIGURE 1 is a vertical cross-sectional view of an improved aerator constructed in accordance with one form of the present invention.

FIGURE 1A is a partial vertical cross-sectional view of a modification of the species of FIGURE 1.

FIGURE 2 is a top view of the plastic perforate disk member of the aerator shown in FIGURE 1.

FIGURE 3 is a cross-sectional view of mold sections showing the disk member of FIGURE 1 as it appears in its molding cavity.

FIGURE 4 is a bottom view of the aerator shown in FIGURE 1.

FIGURE 5 is a vertical cross-sectional detail of a portion of said disk member as viewed in section 5—5 of FIGURE 2.

FIGURE 6 is a transverse cross-sectional detail view of the portion of the disk member taken on the line 6—6 of FIGURE 5.

FIGURE 7 is a vertical cross-sectional detail view illustrating a portion of a further improved plastic perforated disk member constructed in a modified form in accordance with the present invention.

FIGURE 8 is a transverse cross-sectional detail view taken on line 8—8 of FIGURE 7.

FIGURE 9 is a vertical cross-sectional detail view illustrating still another form of perforate disk member constructed in accordance with the present invention.

FIGURE 10 is a transverse cross-sectional detail view taken on line 10—10 of FIGURE 9.

FIGURE 11 is a perspective detail view illustrating a method of making the pin portion of the mold.

FIGURE 12 is a sectional detail of a modified form of mold and disk member therein.

Referring to FIGURE 1, the improved water aerator constructed in accordance with the present invention comprises a casing 10 threadedly connected to an upstream water faucet 11 at one end thereof and a downstream water outlet 12 at the other end thereof. Alternatively the casing could bear a male thread (not shown) to fit in female threaded spouts or faucets. The outlet end 12 is reduced in diameter by the formation of a shoulder 13 near the downstream end of the casing, the shoulder being formed with air inlet openings 14 further described below. Disposed within the casing is an improved plastic perforate diaphragm or disk member 15 constructed in accordance with the present invention. The disk member is formed with a plurality of elongated substantially tubular perforations or passageways 16 therein. The upstream surface of disk member 15 is constructed with annular ribs 17 defining grooves 18 therebetween communicating with the upstream water faucet 12. Each of the radially extending outer walls 19 of ribs 17 coincides with a side portion of the upper end of each passageway 16, to form a restricted entrance opening or orifice 20.

As illustrated in FIGURE 1, each of the entrance openings 20 is provided with a step 21 having a sharp edge inside the orifice 20. Water forced through the several orifices 20 and passageways 16 is given such turbulence by the stepped construction that the issuing jet streams have impaired coherence and tend to draw into the combined multiplicity of jet streams a greatly increased volume of air so the jet streams enter aeration chamber 32 downstream from disk 15. As viewed in FIGURE 1, upper screen 22 and lower screen 23 serve to retain the increased volume of air in the issuing stream of water and to produce a soft, continuous, coherent, bubbly, oxygenated steam emerging from the aerator. The multiplicity of jet streams issuing from the disk, entrain a large volume of air in aeration chamber 32 from air inlet openings 14 which extend vertically upward through shoulder 13. Dependent flange 24 formed integrally with the lower portion of disk 15 is interrupted by a series of openings 25 providing communication between air inlet openings 14 and aeration chamber 32, and leaving a series of arcuate fingers 26 which abut on the top side of screen 22 to provide a definite spacing of the disk 15 above screen 22, thereby defining an aeration chamber 32 as referred to above. Screen 22 may be supported by an annular frame 27. Lower screen 23 is mounted upon an inturned flange 28 at the downstream water outlet 12 and is held in place by a suitable sleeve 29 interposed between the peripheral edge of screen 23 and frame 27 on screen 22. Sleeve 29 has a force-fit with the inner surface of water outlet 12 of casing 10 so as to hold screen 23 securely in position when the aerator is disassembled. Screen 23 could be securely positioned without sleeve 29 if held by spot-welding. The central portion of the top or upstream surface of disk 15 is formed with an integral pin or projection 30, which serves as a handle for assembling and disassembling disk 15 into and from casing 10. Likewise, the downstream surface of disk 15 is formed with an integral pin or projection 31 having a force-fit into the center of upper screen 22 so that the latter may be centered transversely on shoulder 13 and may be withdrawn with the disk 15 during disassembly of the aerator. Disassembly and re-assembly of the aerator are thereby facilitated for cleaning of the passageways in the disk and for washing away of any particles caught in the mesh of upper screen 22. While the aerator is disassembled, lower screen 23 may likewise be cleaned by back-flowing water through the lower screen 23 while it remains assembled with the casing 10. An axially extending peripheral flange 33 is formed on the upstream side of disk 15 serving to position the disk in casing 10 by abutment and sealing engagement with the end of faucet 11.

In practice, the disk 15 may include three substantially concentric rows of passageways or perforations 16, and the two radially outermost annular ribs 17 on the upstream surface of disk 15 are disposed so that they cover and partially close the inlet ends of the perforations 16 of the two radially outermost concentric rows. The innermost row of perforations 16 have their entrance openings 20 extending into the sides of pin 30, as shown in FIGURE 1, or alternatively may extend into an innermost rib (not shown), adjacent pin 30.

Another embodiment of the present invention is shown in FIGURE 7, this form of the invention comprising a disk 15a formed with a plurality of concentric rows of perforations or passageways 16a extending therethrough, and further provided with a plurality of concentric annular ribs 17a disposed to cover the rows of perforations 16a at their upstream ends. In this construction the annular ribs 17a are of the same width as the passageways 16a, the latter projecting into the ribs 17a a substantial portion of the height of the ribs, providing opposed openings 20a in each side of the ribs where the passageways 17a intersect and are coincident with the radially inner and outer side walls of the ribs. As a result, jet streams of water entering the passageways 16a from both sides of each annular rib 17a, impinge upon each other thereby creating an extensive turbulence so that the water issues from the passageways 16a into the aeration chamber in the form of streamlets having greatly impaired coherence. As illustrated in FIGURE 7, the upstream surfaces of the ribs 17a may be beveled or rounded for streamline flow of water into openings 20a in the sides of the ribs.

The disc 15a may have one or more circular rows of holes 16a. In either case the holes 16a may be elongated so as to extend toward the neighboring holes 16a of the same circular row; and indeed if the parts are suitably supported the holes 16a may be elongated to such extent that they join together forming a narrow circular opening. Moreover, two or more holes of a given row may be joined to form an elongated slot. In the modifications suggested in this paragraph, ribs 17a and opposed openings 20a remain unchanged.

In still another embodiment of the invention, illustrated in FIGURES 9 and 10, the disk 15b is formed with a plurality of concentric rows of passageways or perforations 16b, the upstream ends of which extend partially into annular ribs 17b, each passageway 16b having its upstream sides coincident with the opposite side walls of the respective ribs into which it projects, providing opposed openings 20b in each side of the ribs adjacent the passageways, in a manner similar to the form of the invention shown in FIGURE 7. In this embodiment, however, the upstream end of the passageway is formed with a pair of opposed steps 21b whereby water forced through the opposed openings 20b of each passageway is given added turbulence by the stepped construction so that the jet streams of water passing over the stepped construction impinge upon each other thereby creating added turbulence with the result that the jet streams then entering the aeration chamber will be further broken up into streamlets of more greatly impaired coherence. The upstream surfaces of ribs 17b may be beveled or rounded for streamlining the flow of water around the annular ribs and into openings 20b in the sides of the ribs.

In each of the embodiments of the invention, the preferred shape of passageways 16, 16a, and 16b is shown as cross-sectionally substantially square, trapezoidal or rectangular, the radially outer surfaces of the passageways being on the same curvature as the radially outer surfaces of the annular ribs, so that the ends of the passageways which project into the ribs are coincident with the side surfaces of the ribs, leaving clear openings in the sides of the ribs. In the form of the invention shown in FIGURES 7 and 9 the radially inner surfaces of the passageways are similarly on the same curvature as the radially inner surfaces of the annular ribs.

Optimum conditions of aeration and coherence of the issuing stream of water may be determined by experimenting with different sizes of passageways 16, different thicknesses of disk 15 and different dimensions for the entrance opening 20 and stop 21. These dimensions are found to vary with the diameter and longitudinal dimension of the aeration chamber 32 and spacing of screens 22 and 23, as well as the size of wire and mesh of the screens. For example, I find the following dimensions will produce excellent results in the form of the invention illustrated in FIGURES 1 to 6 inclusive and 9 and 10:

| | |
|---|---|
| Diameter of disk _____ mm__ | 20.7 |
| Width of annular ribs _____ mm__ | 1.2 |
| Cross section of passageways _____ mm__ | 0.9 x 0.9 |
| Distance from top of ribs to entrance opening _____ mm__ | 0.3 |
| Distance vertically from top of entrance opening to edge of step _____ mm__ | 0.3 |
| Distance vertically from edge of step to the bottom of grooves _____ mm__ | 0.54 to 0.6 |
| Thickness of disk from bottom of grooves to lower face _____ mm__ | 3.5 |
| Height of annular ribs from bottom of groove _____ mm__ | 1.3 |
| Spacing of disk above top screen ____ mm__ | 5.5 |
| Diameter of discharge orifice _____ mm__ | 17.0 |
| Size of screen mesh—openings per inch ____ | 40 |
| Diameter of screen wire _____ inch__ | 0.009 |
| Spacing between top and bottom screens _____ mm__ | 2.5 |
| Number of perforations _____ | 30 |

The 30 passageways or perforations are 16 in the outer row, 10 in the middle row, and 4 in the inner row.

In the form of the invention illustrated in FIGURES 7 and 8, the same dimensions afford excellent operation, except for the following changes:

| | |
|---|---|
| Width of annular ribs _____ mm__ | 0.9 |
| Thickness of disk from bottom of groove to lower face _____ mm__ | 2.5 |
| Height of openings in sides of ribs ___ mm__ | 0.4 |

The plastic disk member 15 may be injection molded in a mold as shown in FIGURE 3 in which an upper mold section 34 meets with a lower mold section 35 to define a cavity of the same shape as the disk member to be molded therein. A sprue 36 is formed in the mold wall, preferably communicating with the portion of the cavity for molding projection 30. The sprue is formed with a reverse draft having outwardly flaring surfaces, so that when the mold is parted for extraction of the plastic disk member, the plastic material at the top margin of the projection 30 will be broken off.

The mold cavity may be filled by injection molding therein in a manner well-known in the art, through sprue 36, a molten plastic molding material, such as polyethylene or a copolymer of vinyl and vinylidene chlorides. These plastic materials are preferred compositions in view of their toughness, elasticity, ease of accurate molding, ability to form a good seal with metallic surfaces with which they come into contact, and their ability to withstand corrosion and to resist the building up thereon of scale, such as normally forms on surfaces exposed to flow of hot water. A number of other plastic compositions are suitable, however, for use in disk member 15, for example, phenolic resins, nylon and other thermosetting and thermoplastic materials which have a sufficiently high softening point as not to be unduly softened by contact with hot water at the temperature at which the aerator is to be subjected.

In the molding of plastic products heretofore manufactured by means of molding operations in which a pin is employed to form a passageway or other aperture through the plastic material, it has been the practice to have the end of the pin abut flush against the surface of the mating mold member, or to project into a tight fitting socket or recess in the mating mold member. In the use of the abutting mold surfaces, a flash is usually formed between the end of the pin and the mating mold surface. This requires an additional operation for the removal of flash where the same is detrimental to the utility of the product as in the present case. In the prior art example where the pins extend into recesses, the pins, becoming displaced or distorted by pressure and handling of the mold, soon lose the super-accuracy required for molding minutely detailed tight fitting parts, and as soon as a pin becomes bent, it will break instead of entering its tight fitting recess. In the present case, the pins 37 for molding passageways 16, 16a or 16b, project into, but not entirely through, annular cavities or grooves 42 in the mold designed to produce annular ribs 17, 17a or 17b; thus the free space around the ends of the pins avoids the need for super-accuracy and eliminates pin breakage. Furthermore, to the wiping and wedging contact between the sides of pins 37 and the sides of ribs 38 in the mold for molding the annular grooves between annular ribs 17, prevents the formation of any flash in the openings between passageways 16 and said annular grooves at the sides of ribs 17.

As shown in FIGURES 1 to 10 inclusive, passageways 16, 16a and 16b may be uniform in width both laterally and radially. In some instances it has been found advisable, however, to flare these passageways outwardly in a downstream direction, to increase turbulence of the jet streams of water passing therethrough for the purpose of more greatly impairing their coherence and incorporating a greater quantity of air mixed with the water in the aeration chamber. A detail of a mold and portion of a diaphragm embodying this modification is shown in FIGURE 12, in which the upper mold section 34c is formed with an annular groove 42c into which the uniform end section 44 of pin 37c projects part way. The passageway molding pin 37c is then tapered outwardly toward lower mold section 35c to provide a flared passageway 16c in diaphragm 15c. The flared side 45 may be on a radial side or both radial sides of the passageway 16c and may be on one or both lateral sides of said passageway (not shown). Corresponding sides of pin 37c will be provided with a beveled surface 46 to form such flared passageway 16c to produce a divergence of the issuing streamlets of water.

The invention may be embodied as a permanent and integral part of a faucet, or the main portion of the casing for the aeration chamber may be a permanent and integral part of a faucet construction, the internal members being held in position in the permanent faucet spout as shown in FIGURE 1A. In this form of the invention, the spout of the faucet 11d is formed on its end with a recessed end portion 10d into which the assembly of diaphragm 15d and screen 22d may be inserted and held in place by means of a screw-threaded ferrule 43, the male and female threads being interchangeably formed on the end 10d of the faucet and ferrule 43. Ferrule 43 is provided with air inlet openings 14d communicating with aeration chamber 26d for the same purpose as openings 14 FIGURE 1. The remainder of the aerator structure and its function are the same as those illustrated and described in connection with FIGURE 1.

An efficient manner of manufacturing the mold sections 34 and 35 is accomplished by machining grooves and recesses in the mold sections, as illustrated, the pins 37 being machined in the ends of the tubular sections 39. The form of pins 37 employed for molding passageways 16, as shown in FIGURES 1 to 6 inclusive, are formed on their ends with steps 40. The pins for molding passageways 16b, FIGURE 9, are similarly formed with pairs of steps or slots in the ends of the pins (not shown). The tubular members 39 with pins 37 machined on one end are then press-fitted into grooves 41 in the lower section 35 of the mold, different diameters of tubular members 39 being fitted into concentric grooves 41 of corresponding diameters to provide the concentric rows of pins 39 in the mold, and corresponding concentric rows of perforations or passageways 16, 16a, 16b or 16c in respective disks 15, 15a, 15b and 15c.

In the form of the invention shown in FIGURE 12, pins 37c for producing flared passageway 16c are formed in the end of a tubular member 39c having a beveled portion for molding beveled surface 46. The continuous end of tubular member 39c may be force-fitted into a groove (not shown) in lower mold section 35c, or as shown in FIGURE 12 the lower mold section may be made up of a plurality of tightly fitting tubular ring members 47, 39c, 48, etc. This system may also be employed in the building up of the lower mold section 35 if so desired.

It will be seen that, in accordance with this invention, the novel and improved faucet aerator has been construted for producing a soft, continuous, coherent, bubbly, oxygenated stream of water emerging from the aerator, resulting from greater turbulence and finer division of water particles in the jet streams of water passing through the novel type of perforated disk. The new and improved design of molded plastic disk affords added advantages in the facility of accurate and economical production; the avoidance of corrosion and scale formation; and the facility for cleaning out any foreign particles deposited from the water. The novel combination of lateral passageways extending vertically in the periphery of the disk and the downwardly directed openings in the periphery of the casing in communication with the lateral passageways, provide a construction which will still direct the stream of water downwardly in the event the downstream screens are clogged, whereas the prior types of aerators having laterally extending air-inlet openings, will direct streams of water laterally if the streams below the air and water mixing chamber become clogged with foreign matter. The new method of molding the perforated plastic disk, whereby the perforation molding pins in one mold section, extend into grooves in the opposing mold section, with the ends of the pins and two or three sides of the pins free of contact with the opposing mold section, affords a novel economical molding process avoiding the production of flash at the ends of the perforations and the accompanying additional labor of removing such flash. The improved mold also embodies the novel feature of providing concentric annular rows of perforation-forming pins having substantially square, trapezoidal or rectangular cross-sections, wherein the pins are produced on the ends of tubular members, the latter then being fitted into grooves in the molds. By providing perforation-molding pins having a substantially square, trapezoidal or rectangular cross-section, the pins can be formed as segments of annuli with the radially inner or outer segmental annular surface of a pin projecting from one mold section coincidentally contacting the side of an annular groove or rib of the same radius in the opposed mold section, to mold clear openings free of flash.

The foregoing, new and inventive features of construction and new and improved methods of manufacture are defined in the appended claims.

I claim:

1. An aerator for a water faucet for producing a coherent, bubbly stream, said aerator comprising a casing adapted to be attached to said faucet, said casing having means on its upstream end for attachment to said faucet and a discharge orifice at the downstream end thereof, an upstream perforated diaphragm positioned in said casing, the perforations in said diaphragm being substantially rectangular in cross-section and being arranged in concentric annular rows, alternating concentric annular ribs and grooves in the upstream surface of said diaphragm, the upstream ends of said perforations extending into said annular ribs and communicating with said grooves through the radially inner and radially outer sidewalls of said ribs, stepped formations at the radially inner and radially outer portions of the upstream ends of said perforations for causing turbulence in impinging streams of water passing into said perforations through said radially inwardly and radially outwardly directed openings in said ribs, a downstream screen in said casing in spaced relation to said diaphragm to provide an aeration chamber, a shoulder on the downstream end of said casing provided with air passageways radially outwardly of the discharge orifice and extending in the general direction of flow of the stream of water from said discharge orifice, and said diaphragm having channels disposed about the periphery thereof providing communication between said air passageways in the shoulder of the casing and said aeration chamber, whereby water passing in the form of streamlets through the perforations of said diaphragm may entrain air flowing upwardly from said air passageways into said aeration chamber, and in the event said screen becomes clogged with debris and sediment from the water passing therethrough, any backflow of water through the air passageways will be directed in the same direction as said coherent, bubbly stream.

2. An aerator for a water faucet for producing a coherent, bubbly stream, said aerator comprising a casing adapted to be attached to said faucet, said casing having means on its upstream end for attachment to said faucet and a discharge orifice at the downstream end thereof, an upstream perforated diaphragm positioned in said casing, said diaphragm being provided with elongated water passageways extending therethrough each of which passageways has a restricted entrance opening adjacent its upstream end, a downstream screen in said casing in spaced relation to said diaphragm to provide an aeration chamber, a shoulder on the downstream end of said casing provided with air passageways radially outwardly of the discharge orifice and extending in the general direction of flow of the stream of water from said discharge orifice, and said diaphragm having channels disposed about the periphery thereof providing communication between said air passageways in the shoulder of the casing and said aeration chamber, whereby water emerging from the downstream ends of said elongated water passageways may entrain air flowing upwardly from said air passageways into said aeration chamber, and in the event said screen becomes clogged with debris and sediment from the water passing therethrough, any backflow of water through the air passageways will be directed in the same direction as said coherent, bubbly stream.

3. An aerator for a water faucet for producing a coherent, bubbly stream, said aerator comprising a casing adapted to be attached to said faucet, said casing having means on its upstream end for attachment to said faucet and a discharge orifice at the downstream end thereof, an upstream perforated diaphragm positioned in said casing, the perforations in said diaphragm being substantially rectangular in cross-section and being arranged in concentric annular rows, alternating concentric annular ribs and grooves in the upstream surface of said diaphragm, the upstream ends of said perforations extending into said annular ribs and communicating with said grooves through the radially inner and radially outer sidewalls of said ribs, a stepped formation at the radially outer portions of the upstream ends of said perforations for causing turbulence in streams of water passing into said perforations through said radially outwardly directed openings in said ribs, a downstream screen in said casing in spaced relation to said diaphragm to provide an aeration chamber, a shoulder on the downstream end of said casing provided with air passageways radially outwardly of the discharge orifice and extending in the general direction of flow of the stream of water from said discharge orifice, and said diaphragm having channels disposed about the periphery thereof providing communication between said air passageways in the shoulder of the casing and said aeration chamber, whereby water passing in the form of streamlets through the perforations of said diaphragm may entrain air flowing upwardly from said air passageways into said aeration chamber, and in the event said screen becomes clogged with debris and sediment from the water passing therethrough, any backflow of water through the air passageways will be directed in the same direction as said coherent, bubbly stream.

4. An aerator for a water faucet for producing a coherent, bubbly stream, said aerator comprising a casing having means adjacent its upstream end adapted for attachment to said faucet and a discharge orifice at the downstream end thereof, an upstream diaphragm positioned in said casing, said diaphragm defining a plurality of elongated water passageways extending therethrough each of which passageways is longer than it is wide and each of which passageways is provided with a restricted water entrance opening, a downstream screen in said casing in spaced relation to said diaphragm to provide an aeration chamber, the downstream end of said casing being provided with air passageways disposed radially outwardly of the discharge orifice and extending parallel to the general direction of flow of the stream of water from said discharge orifice, and said diaphragm being provided with integral means adjacent the downstream side of said diaphragm defining channels disposed about the periphery thereof providing communication between said air passageways in the casing and said aeration chamber adjacent the downstream ends of said water passageways.

5. An aerator for a water faucet for producing a coherent, bubbly stream, said aerator comprising a casing adapted to be attached to said faucet, said casing having means on its upstream end for attachment to said faucet and a discharge orifice at the downstream end thereof, an upstream perforated diaphragm positioned in said casing, the perforations in said diaphragm being substantially rectangular in cross-section and being arranged in concentric annular rows, alternating concentric annular ribs and grooves in the upstream surface of said diaphragm, the upstream ends of said perforations extending into said annular ribs and communicating with said grooves through the radially inner and radially outer sidewalls of said ribs, stepped formations at the radially inner and radially outer portions of the upstream ends of said perforations for causing turbulence in impinging streams of water passing into said perforations through said radially inwardly and radially outwardly directed openings in said ribs, a downstream screen in said casing in spaced relation to said diaphragm to provide an aeration chamber, said casing being provided with air passageways providing communication to said aeration chamber, whereby water passing in the form of streamlets through the perforations of said diaphragm may entrain air flowing from said air passageways into said aeration chamber to produce a coherent, bubbly stream.

6. An aerator for a water faucet for producing a coherent, bubbly stream, said aerator comprising a casing adapted to be attached to said faucet, said casing having means on its upstream end for attachment to said faucet and a discharge orifice at the downstream end thereof, an upstream perforated diaphragm positioned in said casing, the perforations in said diaphragm being substantially rectangular in cross-section and being arranged in concentric annular rows, alternating concentric annular ribs and grooves in the upstream surface of said diaphragm, the upstream ends of said perforations extending into said annular ribs and communicating with said grooves through the radially inner and radially outer sidewalls of said ribs, a stepped formation at the radially outer portions of the upstream ends of said perforations for causing turbulence in streams of water passing into said perforations through said radially outwardly directed openings in said ribs, a downstream screen in said casing in spaced relation to said diaphragm to provide an aeration chamber, said casing being provided with air passageways providing communication to said aeration chamber, whereby water passing in the form of streamlets through the perforations of said diaphragm may entrain air flowing from said air passageways into said aeration chamber to produce a coherent, bubbly stream.

7. A water faucet aerator for producing a coherent, bubbly, oxygenated stream, said aerator comprising a casing having means on its upstream end for attachment to a facuet and a discharge orifice at the downstream end thereof, an upstream perforated diaphragm positioned in said casing, the perforations in said diaphragm being substantially rectangular in cross-section and being arranged in concentric annular rows, alternating concentric annular ribs and grooves in the upstream surface of said diaphragm, the upstream ends of said perforations extending into said annular ribs and communicating with said grooves through the radially inner and radially outer sidewalls of said ribs providing right angular courses for streams of water through said perforations for causing turbulence in said water streams, a downstream screen in said casing in spaced relation to said diaphragm adjacent said discharge orifice to provide an aeration chamber, said casing being provided with air passageways for communication of air to said aeration chamber, whereby water passing in the form of turbulent jet streams through the perforations of said diaphragm may entrain air flowing from said air passageways into said aeration chamber to produce a coherent, bubbly, oxygenated stream.

8. For use in a water faucet aerator comprising a casing having means on its upstream end for attachment to a faucet, a discharge orifice at the downstream end thereof having a screen therein, and passageways in said casing for access of air therein, the improvement which comprises a perforated molded plastic diaphragm adapted to be positioned in said casing between said ends thereof, the perforations in said diaphragm forming elongated passageways arranged in concentric annular rows to permit water to pass through said diaphragm in the form of jet streams, alternating concentric annular ribs and grooves in the upstream surface of said diaphragm, the upstream ends of said perforations projecting only partially through the axial extent of said annular ribs and having their radially inner and radially outer arcuate boundaries substantially coincident with the respective radially inner and radially outer sides of said annular ribs and forming opposed lateral openings extending into said annular grooves so as to communicate with said grooves through said opposed openings in the radially inner and radially outer sidewalls of said ribs, such perforations thereby providing angular courses of opposed impinging streams of water through said opposed lateral openings for causing turbulence in said water jet streams, to entrain air flowing from said air passageways into said casing to produce a coherent, bubbly, oxygenated stream at the discharge orifice.

9. In combination in a water faucet aerator for producing an aerated water stream, in which said aerator comprises a casing having means on its upstream end for attachment to a faucet, a discharge orifice at the downstream end thereof having a screen therein, and passageways in said casing for access of air therein, a perforated molded plastic diaphragm positioned in said casing between said ends thereof, the perforations in said diaphragm being substantially rectangular in cross-section, forming passageways arranged in concentric annular rows to permit water to pass through said diaphragm in the form of jet streams, alternating concentric annular ribs and grooves in the upstream surface of said diaphragm, the upstream ends of each of said perforations projecting to a partial extent through said annular ribs in an axial direction and having at least one of their arcuate boundaries coincident with a lateral side of an annular rib for forming lateral openings in the sidewalls of said ribs extending into said annular grooves to provide communication of said grooves with said perforations through said openings, such grooves, openings and perforations providing angular courses for streams of water through said lateral openings for causing turbulence in said water jet streams, to entrain air flowing from said air passageways into said casing to produce a coherent, bubbly, oxygenated stream at the discharge orifice.

10. In combination in a water faucet aerator for producing an aerated water stream, a casing having means on its upstream end for attachment to a faucet, a discharge orifice at the downstream end of said casing having a screen therein, passageways in said casing for access of air into said casing, a perforated diaphragm positioned in said casing between said upstream and downstream ends thereof, the perforations in said diaphragm being substantially rectangular in cross-section, forming passageways arranged in concentric annular rows to permit water to pass through said diaphragm in the form of jet streams, alternating concentric annular ribs and grooves in the upstream surface of said diaphragm, the upstream ends of said perforations having their radially inner and radially outer arcuate boundaries coincident with the respective radially inner and radially outer boundaries of said annular ribs and forming opposed lateral openings in the radially inner and radially outer sidewalls of said ribs extending into said annular grooves so as to communicate with said grooves through said opposed openings, such perforations thereby providing right angular courses of opposed impinging streams of water through said opposed lateral openings for causing turbulence in said water jet streams, to entrain air flowing from said air passageways into said casing to produce a coherent, bubbly, oxygenated stream at the discharge orifice.

11. For use in a water faucet aerator, a perforated diaphragm for producing jet streams of water in said aerator, the perforations in said diaphragm being substantially rectangular in cross-section, forming passageways arranged in concentric annular rows, alternating concentric annular ribs and grooves in the upstream surface of said diaphragm, the upstream ends of said perforations each having at least one of its arcuate boundaries coincident with a lateral side of said annular ribs and forming lateral openings in the sidewall of said ribs extending into said annular grooves so as to communicate with said grooves through said openings, the upstream ends of said perforations extending only partially through the axial extent of said ribs.

12. In combination in a water faucet aerator for producing an aerated water stream, a casing having means on its upstream end for attachment to a faucet, a discharge orifice at the downstream end thereof having a screen therein, passageways in said casing for access of air into said casing, a perforated diaphragm positioned in said casing between said ends thereof, the perforations in said diaphragm being substantially rectangular in cross-section, forming passageways arranged in concentric annular rows to permit water to pass through said diaphragm in the form of jet streams, alternating concentric annular ribs and grooves in the upstream surface of said diaphragm, the upstream ends of said perforations extending partially through said ribs and having their radially inner and radially outer arcuate boundaries coincident with the respective radially inner and radially outer boundaries of said annular ribs and forming opposed lateral openings in the radially inner and radially outer sidewalls of said ribs extending into said annular grooves, said perforations ommunicating with said grooves through said opposed openings, such perforations thereby providing right angular courses of opposed impinging streams of water through said opposed lateral openings for causing turbulence in said water jet streams, whereby said jet streams may entrain air flowing from said air passageways into said casing to produce a coherent, bubbly, oxygenated stream at the discharge orifice.

13. In combination in a water faucet aerator for producing an aerated water stream, a casing having means on its upstream end for attachment to a faucet, a discharge orifice at the downstream end thereof having a screen therein, passageways in said casing for access of air into said casing, a perforated diaphragm positioned in said casing between said ends thereof, the perforations in said diaphragm being substantially rectangular in cross-section, forming passageways arranged in concentric annular rows to permit water to pass through said diaphragm in the form of jet streams, alternating concentric annular ribs and grooves in the upstream surface of said diaphragm, the upstream ends of said perforations extending partially through said ribs and having their radially outer arcuate boundaries coincident with the radially outer boundaries of said annular ribs and forming lateral openings in the radially outer sidewalls of said ribs extending into said annular grooves, said perforations communicating with said grooves through said openings, such grooves, openings and perforations thereby providing right angular courses of streams of water through said lateral openings for causing turbulence in said water jet streams, whereby said jet streams may entrain air flowing from said air passageways into said casing to produce a coherent, bubbly, oxygenated stream at the discharge orifice.

14. For use in a water faucet aerator comprising a casing having means on its upstream end for attachment to a faucet, a discharge orifice at the downstream end thereof, and passageways in said casing for access of air into said casing, the improvement which comprises a molded plastic diaphragm adapted to be positioned in said casing between said ends thereof, elongated perforations in said diaphragm each of which perforations is substantially rectangular in cross-section, said perforations forming elongated water passageways arranged in concentric annular rows to permit water to pass through said diaphragm in the form of jet streams, alternating concentric annular ribs and grooves in the upstream surface of said diaphragm, the upstream ends of said perforations being provided with water entrance orifices extending into said annular grooves, said orifices and perforations providing angular courses for streams of water through said orifices into said perforations for causing turbulence in said water jet streams, to entrain air flowing from said air passageways into said casing to produce an aerated stream at the discharge orifice.

15. For use in a water faucet aerator for producing an aerated water stream, a casing having means on its upstream end for attachment to a faucet, a discharge orifice at the downstream end thereof, and an air passageway in said casing for access of air into said casing, the improvement which comprises a perforated diaphragm adapted to be positioned in said casing between said ends thereof, the perforations in said diaphragm being longer than they are wide and extending in a generally axial direction through said diaphragm to form elongated water passageways through said diaphragm, alternating ribs and grooves in the upstream surface of said diaphragm, the upstream ends of said perforations extending partially through the axial extent of said ribs, said ribs having lateral orifices extending into said grooves and providing means for communication between said perforations and said grooves through at least one of the sidewalls of said ribs, such orifices and perforations thereby providing courses for streams of water through said lateral orifices into said perforations arranged to produce turbulence in water passing through said water passageways and adapted to entrain air flowing from said air passageways into said casing thereby to produce an aerated stream at the discharge orifice.

16. A water faucet comprising an aeration chamber for producing an aerated stream of water, a discharge orifice at the downstream end of said chamber, a perforated cylindrical diaphragm positioned in said chamber upstream from said discharge orifice, the perforations in said diaphragm being substantially rectangular in cross-section and being arranged in a concentric annular row, a concentric annular rib in the upstream surface of said diaphragm, the upstream ends of said perforations extending into said annular rib and communicating with the upstream portion of said chamber through the radially inner and radially outer sidewalls of said rib providing right angular courses for streams of water through said perforations for causing turbulence in said water streams, a downstream screen in said chamber in spaced relation to said diaphragm adjacent said discharge orifice, said chamber being provided with air passageways for communication of air thereto, whereby water passing in the form of turbulent jet streams through the perforations of said diaphragm may entrain air flowing from said air passageways into said aeration chamber to produce a coherent, bubbly, oxygenated stream.

17. A water faucet comprising an aeration chamber for producing an aerated stream of water, a discharge orifice at the downstream end of said chamber, a perforated cylindrical diaphragm positioned in said chamber upstream from said discharge orifice, the perforations in said diaphragm being substantially rectangular in cross-section and being arranged in a concentric annular row, a concentric annular rib in the upstream surface of said diaphragm, the upstream ends of said perforations extending into said annular rib, said perforations flaring outwardly from said upstream ends to their downstream ends, said perforations communicating with the upstream portion of said chamber through the radially inner and radially outer sidewalls of said rib providing right angular divergent courses for streams of water through said perforations for causing turbulence in said water streams, a downstream screen in said chamber in spaced relation to said diaphragm adjacent said discharge orifice, said chamber being provided with air passageways for communication of air thereto, whereby water passing in the form of turbulent jet streams through the perforations of said diaphragm may entrain air flowing from said air passageways into said aeration chamber to produce a coherent, bubbly, oxygenated stream.

18. For use in a water faucet aerator, a cylindrical perforated diaphragm for producing jet streams of water in said aerator, the perforations in said diaphragm being substantially rectangular in cross-section, forming passageways arranged in a concentric annular row, a concentric annular rib in the upstream surface of said diaphragm, the upstream ends of each of said perforations having at least one of its arcuate boundaries coincident with a lateral side of said annular rib and forming lateral openings through the sidewall of said rib so as to communicate with the upstream side of said diaphragm through said openings, the upstream ends of said perforations extending only partially through the axial extent of said rib.

19. For use in a water faucet aerator, a cylindrical perforated diaphragm for producing jet streams of water in said aerator, the perforations in said diaphragm being substantially rectangular in cross-section, forming passageways arranged in a concentric annular row, a concentric annular rib in the upstream surface of said diaphragm, the upstream ends of said perforations each having at least one of its arcuate boundaries coincident with the lateral side of said annular rib and forming lateral openings through the sidewall of said rib so as to communicate with the upstream side of said diaphragm through said openings, the upstream ends of said perforations extending only partially through the axial extent of said rib, said perforations flaring from their upstream ends outwardly to their downstream ends.

20. For use in a water faucet aerator, a diaphragm for producing jet streams of water, said diaphragm having perforations forming elongated water passageways, of substantially rectangular cross-section, extending through said diaphragm in a generally axial direction, at least one groove in the upstream surface of said diaphragm, a boundary surface adjacent said groove having openings formed therein communicating the upstream ends of said water passageways with said groove, said openings being so disposed with respect to said water passageways that water passes from said groove through said openings into said passageways at an angle to the major axes of said elongated passageways.

21. For use in a water faucet aerator, a substantially cylindrical diaphragm for producing jet streams of water, perforations in said diaphragm forming elongated water passageways through said diaphragm arranged in a substantially annular row, and a substantially annular rib in the upstream surface of said diaphragm extending adjacent the upstream ends of said passageways, said rib having flow impairing openings therein communicating the upstream ends of said water passageways with the upstream side of said diaphragm through said openings.

22. The structure of claim 21 wherein said elongated passageways are tapered in the direction of their elongation.

23. For use in a water faucet aerator, a perforated diaphragm for producing jet streams of water, the perforations in said diaphragm forming elongated passageways extending in a generally axial direction through said diaphragm, a rib in the upstream surface of said diaphragm, said rib having openings therein communicating the upstream ends of said passageways with the upstream side of said diaphragm, said elongated passageways flaring from their upstream ends outwardly to their downstream ends.

References Cited in the file of this patent

UNITED STATES PATENTS

| | | |
|---|---|---|
| 2,554,607 | Woolf | May 29, 1951 |
| 2,569,195 | Quetsch et al. | Sept. 25, 1951 |
| 2,730,766 | Tompkins | Jan. 17, 1956 |
| 2,741,467 | Lee et al. | Apr. 10, 1956 |
| 2,774,584 | Aghnides | Dec. 18, 1956 |
| 2,787,452 | Aghnides | Apr. 2, 1957 |
| 2,799,050 | Traycoff | July 16, 1957 |
| 2,888,209 | Hjulian | May 26, 1959 |
| 2,935,265 | Richter | May 3, 1960 |